United States Patent [19]

Klaerner et al.

[11] 4,282,341

[45] * Aug. 4, 1981

[54] MANUFACTURE OF HOMOPOLYMERS AND COPOLYMERS OF α-MONOOLEFINS

[75] Inventors: Peter Klaerner, Battenberg; Gerhard Staiger, Bobenheim-Roxheim; Klaus Bronstert, Carlsberg, all of Fed. Rep. of Germany

[73] Assignee: BASF Aktiengesellschaft, Fed. Rep. of Germany

[*] Notice: The portion of the term of this patent subsequent to Jun. 17, 1997, has been disclaimed.

[21] Appl. No.: 74,758

[22] Filed: Sep. 12, 1979

[30] Foreign Application Priority Data

Sep. 25, 1978 [DE] Fed. Rep. of Germany ....... 2841715

[51] Int. Cl.$^3$ .......................... C08F 4/66; C08F 10/06
[52] U.S. Cl. ................. 526/124; 252/429 B; 526/138; 526/159; 526/351
[58] Field of Search ................. 526/138, 159, 124

[56] References Cited

U.S. PATENT DOCUMENTS 4,130,699  12/1978  Hoff et al. ............................ 526/124

FOREIGN PATENT DOCUMENTS 702140  1/1965  Canada .................................... 526/138

OTHER PUBLICATIONS

Raff et al., Crystallin Olefin Polymers, vol. XX, Part I, Interscience Publish, N.Y. (1965) p. 371.

*Primary Examiner*—Edward J. Smith
*Attorney, Agent, or Firm*—Keil & Witherspoon

[57] ABSTRACT

A process for the manufacture of homopolymers and copolymers of α-monoolefins by polymerizing the monomer or monomers at relatively low temperatures under relatively low pressures by means of a Ziegler-Natta catalyst comprising (I) a titanium chloride component and (II) an aluminumalkyl component, wherein the titanium chloride component (I) employed is obtained by exposing a conventional catalyst component consisting, or substantially consisting, of titanium trichloride or titanium tetrachloride, to a carbon dioxide atmosphere under specific conditions. Catalysts obtained from titanium chloride components (I) which have been treated in this way exhibit a relatively long induction period.

1 Claim, No Drawings

MANUFACTURE OF HOMOPOLYMERS AND COPOLYMERS OF α-MONOOLEFINS

The present invention relates to a process for the manufacture of homopolymers and copolymers of $C_2$–$C_6$-α-monoolefins by polymerizing the monomer or monomers at from 30° to 200° C. under pressures of from 0.1 to 200 bar by means of a Ziegler-Natta catalyst comprising (I) a titanium chloride component and (II) an aluminum-alkyl component of the general formula $AlR_3$ or $ClAlR_2$, where R is $C_1$–$C_8$-alkyl, in the atomic ratio of titanium from catalyst component (I): aluminum from catalyst component (II) of from 1:1 to 1:100.

Processes of this type have proved their value in industry, but there remains scope for a number of minor and major improvements. For example, the titanium chloride component (I) employed is not fully satisfactory in certain respects. For instance, whilst it has been possible to improve titanium chloride components (I) by physical and/or chemical modifications of very diverse types, for example so that the polymers are obtained with particularly high catalyst yields (=amount of polymer per unit amount of catalyst) and/or with particularly high crystallinity (=proportion insoluble in boiling heptane), a significant technological disadvantage had to be accepted in return, namely that the highly active titanium chloride component (I), when brought together with the aluminum-alkyl component (II), gives a catalyst which immediately acts as a starter, ie. which initiates the polymerization immediately after the components have been brought together. This is highly undesirable, especially in continuous polymerization HWz/sk processes. On introducing the titanium chloride component (I) into the polymerization chamber, especially when replenishing the said component, a certain amount of instantly active catalyst forms on the actual introduction device, by combination with aluminum-alkyl component (II) present thereon, and this can, as a result of the instantly formed polymer, lead to blockage of the devices used to introduce the titanium chloride component and hence, ultimately, to stoppages in operation.

It is an object of the present invention to provide a technically improved titanium chloride component (I), especially a component which not only allows the polymers to be obtained with the high catalyst yield and high crystallinity which are desired, but also has the property that on encountering the aluminum-alkyl component (II) it only activates the polymerization after the end of a certain sufficiently long interval of time, referred to as the induction period.

We have found that this object is achieved with a titanium chloride component which is obtained by exposing a relevant conventional titanium trichloride or titanium tetrachloride component to a carbon dioxide atmosphere under specific conditions.

Accordingly, the present invention relates to a process for the preparation of homopolymers and copolymers of $C_2$–$C_6$-α-monoolefins by polymerizing the monomer or monomers at from 30° to 200° C. under pressures of from 0.1 to 200 bar by means of a Ziegler-Natta catalyst comprising (I) a titanium chloride component and (II) an aluminum-alkyl component of the general formula $AlR_3$ or $ClAlR_2$, where R is $C_1$–$C_8$-alkyl, in the atomic ratio of titanium from catalyst component (I): aluminum from catalyst component (II) of from 1:1 to 1:100, wherein the titanium chloride component (I) employed is obtained by exposing a relevant conventional catalyst component consisting, or substantially consisting, of titanium trichloride or titanium tetrachloride to a carbon dioxide atmosphere at a pressure of from 0.1 to 10 bar, preferably from 0.2 to 5 bar and especially from 0.5 to 1 bar, at from −20° to 100° C., preferably from 0° to 50° C. and especially from 10° to 30° C., for a period of from 0.5 to 60 minutes, preferably from 1 to 30 minutes and especially from 5 to 15 minutes.

The following details may be noted in respect of the process according to the invention:

The polymerization process as such can, provided its characteristic specific conditions are adhered to, be carried out in virtually all relevant conventional technological embodiments, for example as a batchwise, cyclic or continuous process, which may be a suspension, solution or dry-phase polymerization. The said technological embodiments, ie. the technological variants of the Ziegler-Natta polymerization of α-monoolefins, are well-known from the literature and from industrial practice, so that more detailed explanations are superfluous. However, it should be noted that the novel titanium chloride component (I), like corresponding conventional catalyst components, can be brought together with the aluminum-alkyl component (II) outside or inside the polymerization vessel, in the latter case, for example, by spatially separate introduction of the components, which may be handled respectively as a suspension (component (I)) and solution (component (II)). It should in addition be noted that the novel process is particularly suitable for the preparation of homopolymers of propylene and of copolymers of propylene with minor amounts of ethylene. It may also be used for the preparation of homopolymers of ethylene, of copolymers of ethylene and of propylene with higher α-monoolefins, and of homopolymers of higher α-monoolefins, eg. but-1-ene, 4-methylpent-1-ene and hex-1-ene. The molecular weights of the polymers can be regulated in the relevant conventional manner, especially by means of hydrogen.

The following may be noted in respect of the novel titanium chloride component (I):

The starting materials used are the relevant conventional catalyst components consisting, or substantially consisting, of titanium trichloride or titanium tetrachloride. As is known, these may essentially be classified under six groups:

(a) Titanium trichlorides as such and titanium trichloride co-crystals with metal halides, especially with aluminum chloride, for example of the formula $TiCl_3 \cdot \frac{1}{3}AlCl_3$. Cf., in this context, U.S. Pat. Nos. 3,128,252 and 3,814,743.

We have found that amongst this group, very fine-particled co-crystals of the formula $TiCl_3 \cdot \frac{1}{3}AlCl_3$ are particularly suitable for the purposes of the present invention.

(b) Titanium trichlorides or titanium trichloride co-crystals, of the type described under (a), which have been modified with electron donors or Lewis bases. A particularly large number of such modified titanium trichloride catalyst components has been proposed, since they are known to offer a plurality of advantages. To avoid unnecessary repetition, reference may be made in this context, for example, to British Pat. No. 851,113, French Pat. No. 1,231,089 and German Laid-Open Applications DOS Nos. 2,301,136, 2,400,190, 2,441,541 and 2,519,582.

For the purposes of the invention, particularly suitable products from amongst this group are very fine-particled co-crystals of the formula $TiCl_3 \cdot \frac{1}{3}AlCl_3$, modified with the following electron donors or bases: ethers, eg. diisoamyl ether and di-n-propyl ether; esters, eg. isoamyl benzoate and ethyl phenylacetate; phosphines, eg. tributylphosphine; phosphine oxides, eg. tributylphosphine oxide; and acid amides, eg. hexamethylphosphoric acid triamide. In general, it is advantageous if the molar ratio of co-crystals: donor or co-crystals: base is from about 1:12 to 1:2.

(c) Pre-activated titanium trichlorides or titanium trichloride co-crystals of the type described under (a). As is known, these are titanium trichloride catalyst components which, before actually being brought together with the aluminum-alkyl component (II) have been pre-activated with an aluminum-alkyl compound of the same type. The starting material for these pre-activated products is frequently titanium tetrachloride, which is reduced to titanium trichloride by the aluminum-alkyl compound.

(d) Titanium trichlorides and their co-crystals, which have been both modified with electron donors or Lewis bases and pre-activated. Such titanium trichloride catalyst components can in a certain sense be regarded as a combination of those described under (b) and (c). A typical example is given in German Laid-Open Application DOS No. 2,335,047.

(e) Titanium tetrachloride as such, which is conventionally used in catalysts of the Ziegler-Natta type.

(f) Titanium tetrachloride which has been modified chemically and/or physically, for example which has been combined with carriers.

We have found that a particularly suitable product for the purposes of the invention is a modified titanium tetrachloride which is obtained when (1) in a first stage
 (1.1) 100 parts by weight of an alcoholate of the general formula $Mg(OD)_2$, where D is alkyl of 1 to 6, preferably of 2 to 4, carbon atoms, are milled with
 (1.2) the appropriate number of parts by weight of a chlorotoluene of the formula

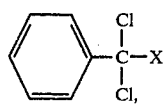

where X is chlorine or hydrogen, preferably chlorine, to give a molar ratio of alcoholate (1.1): chlorine in the chlorotoluene (1.2) of from 100:1 to 100:100, preferably from 100:3 to 100:30,
in a vibratory ball mill, with a milling acceleration of from 30 to 80, preferably from 45 to 55 m×sec$^{-2}$ for a period of from 5 to 100, preferably from 10 to 60, hours at from $-50°$ to $+10°$ C., preferably from $-30°$ to $-5°$ C., in the absence of a diluent, thereafter (2) in a second stage
 (2.1) 100 parts by weight of the material resulting from stage (1) are brought together with
 (2.2) from 300 to 1,800, preferably from 500 to 1,000, parts by weight of titanium tetrachloride, the batch is kept for from 0.1 to 5, preferably from 0.5 to 2, hours at from 40° to 180° C., preferably from 70° to 90° C., with constant mixing, and the resulting solid is isolated, excess titanium tetrachloride being separated off, and finally (3) in a third stage
 (3.1) 100 parts by weight of the solid resulting from stage (2) are again brought together with
 (3.2) from 300 to 1,800, preferably from 500 to 1,000, parts by weight of titanium tetrachloride,
the batch is kept for from 0.1 to 5, preferably from 0.5 to 2, hours at from 40° to 180° C., preferably from 120° to 140° C., with constant mixing, and the resulting solid is isolated, excess titanium tetrachloride being separated off.

The following may be noted in respect of the material composition of the modified titanium tetrachloride (f) thus obtained:

Magnesium alcoholates (1.1) of the type used are well-known and do not require more detailed discussion. It should however be mentioned that particularly suitable alcoholates are derived from ethyl, n-propyl, i-propyl, n-butyl, sec.-butyl and tert.-butyl alcohol.

The relevant chlorotoluenes (1.2) are also prior art compounds and do not require more detailed discussion here.

The titanium tetrachloride (2.2) and (3.2) which is employed should advantageously be of the type conventionally used for polymerization catalysts.

The preparation of the titanium tetrachloride (f), which has been modified in the manner described, is simple and may be carried out, without further explanation, by those skilled in the art. It should merely be mentioned, in respect of stages (2) and (3), that the solid resulting in these is advantageously isolated by suction filtration, whilst the excess titanium tetrachloride is advantageously removed by washing with a liquid hydrocarbon until the latter no longer takes up any titanium tetrachloride. The liquid hydrocarbon used can be of the type which conventionally is brought together with a titanium chloride component for a Ziegler-Natta catalyst without detriment to the catalyst or to its titanium chloride component, for example in carrying out the polymerization of α-monoolefins. Examples of suitable hydrocarbons are pentanes, hexanes, heptanes, gasolines and cyclohexane.

The treatment, with carbon dioxide, of the primary conventional titanium chloride catalyst component which serves as the starting material and has been discussed above may be carried out in a simple manner by the conventional methods of reacting finely divided solids, or liquids, with reactive gases. The relevant methods and equipment are well-known and do not require more detailed discussion here. It should merely be mentioned that strict exclusion of moisture and of oxygen is advisable.

EXAMPLE 1

Preparation of the titanium chloride component (I)

10 g of the primary titanium chloride catalyst component which serves as the starting material (and which has been obtained by thorough dry milling of co-crystals of the formula $TiCl_3 \cdot \frac{1}{3}AlCl_3$ with tributylphosphine in the molar ratio of 1:0.17) is treated, in the absence of moisture, with dried carbon dioxide in an apparatus conventionally used for the reaction of finely divided solids with reactive gases (namely a gas-treatment flask), in such a way that the primary catalyst component is exposed to a carbon dioxide atmosphere at a pressure of 0.95 bar for a period of 5 minutes at 22° C.

Polymerization 0.75 liter of dry n-heptane is introduced into a glass apparatus which has been flushed with dry argon and which comprises a 2 liter four-neck flask, reflux condenser, stirrer and device for the controlled introduction of gas, a rotameter being fitted into the inlet and outlet (in order to determine the amount of propylene consumed as a function of time), and is saturated, at 60° C., with pure propylene under a pressure of 1.05 bar. The following are then added successively, whilst continuing to pass propylene under the same pressure through the apparatus: 10 millimoles of diethyl-aluminum chloride (as the aluminum-alkyl component II), 2 millimoles of octadecyl 3-(3,5-di-tert.-butyl-4-hydroxyphenyl)-propionate (as a promoter) and, finally, 4 -millimoles (calculated as titanium trichloride) of the titanium chloride component (I) obtained after the treatment with carbon dioxide. The polymerization is then carried out for a period of 180 minutes whilst still continuously passing propylene at a constant rate through the apparatus. The outcome of the polymerization is shown in the Table which follows, which also indicates the polymerization rate obtained after 0.5, 1, 10 and 30 minutes, calculated from the time of addition of the titanium chloride component.

Comparative experiment

This is carried out exactly like Example 1, with the sole exception that the treatment of the titanium chloride catalyst component with carbon dioxide is omitted. The results are again shown in the Table.

EXAMPLE 2

Preparation of the titanium chloride component (I)

(A) Preparation of the primary titanium chloride component (1) In the first stage,
(1.1) 100 parts by weight of magnesium ethylate, $Mg(OC_2H_5)_2$, are milled with
(1.2) the appropriate number of parts by weight of benzotrichloride to correspond to a molar ratio of alcoholate (1.1): chlorine in the benzotrichloride (1.2) of 100:16.7, in a vibratory ball mill, with a milling acceleration of 50 $m \times sec^{-2}$, for a period of 30 hours at $-20°$ C. in the absence of a diluent.

(2) In the second stage,
(2.1) 100 parts by weight of the material resulting from stage (1) are brought together with
(2.2) 750 parts by weight of titanium tetrachloride and the batch is kept for 1 hour at from 80° to 85° C., with constant stirring. The resulting solid is then isolated by filtration and washing with n-heptane, the washing being continued until titanium tetrachloride is no longer detectable in the filtrate.

(3) In the third stage,
(3.1) 100 parts by weight of the solid resulting from stage (2) are again brought together with
(3.2) 750 parts by weight of titanium tetrachloride and the batch is kept for 1 hour at from 128° to 132° C., with constant stirring. The resulting solid is then isolated by filtration and washing with n-heptane, the washing being continued until titanium tetrachloride is no longer detectable in the filtrate.

In this way, a primary titanium chloride component is obtained which contains about 6% by weight of titanium, about 60% by weight of chlorine and about 20% by weight of magnesium.

(B) Treatment of the primary titanium chloride component with carbon dioxide:

This is carried out as described in Example 1, with no differences from the latter.

Polymerization

This is also carried out as described in Example 1, with the differences that (i) instead of diethyl-aluminum chloride an identical amount of triethyl-aluminum is used, (ii) instead of octadecyl 3-(3,5-di-tert.-butyl-4-hydroxyphenyl)-propionate an identical amount of ethyl anisate is used and (iii) instead of the 4 millimoles of the titanium chloride component 0.3 g of the titanium chloride component described above is used. The results are shown in the Table.

Comparative experiment

This is carried out exactly like Example 2, with the sole exception that the treatment of the titanium chloride catalyst component with carbon dioxide is omitted. The results are again shown in the Table.

| Example or Comparative Experiment | Polymer Amount$^x$ [g] | Crystalline content$^{xx}$ [%] | Polymerization rate [liters of propylene/h] after | | | |
|---|---|---|---|---|---|---|
| | | | 0.5 min | 1 min | 10 mins | 30 mins |
| 1 | 132 | 96.1 | 0 | 0 | 1 | 10 |
| A | 118 | 95.5 | 8 | 8 | 10 | 10 |
| 2 | 727 | 96.0 | 0 | 0 | 40 | 50 |
| B | 735 | 96.4 | 50 | 60 | 50 | 50 |

$^x$ = after 3 hours
$^{xx}$ = proportion insoluble in boiling heptane

We claim:

1. In a process for the preparation of homopolymers and copolymers of $C_2$-$C_6$-$\alpha$-monoolefins by polymerizing the monomer or monomers at from 30° to 200° C. under pressures of from 0.1 to 200 bar by means of a Ziegler-Natta catalyst comprising (I) a titanium chloride component and (II) an aluminum-alkyl component of the general formula $AlR_3$ or $ClAlR_2$, where R is $C_1$-$C_8$-alkyl, in the atomic ratio of titanium from catalyst component (I): aluminum from catalyst component (II) of from 1:1 to 1:100, the improvement which comprises using as the titanium chloride component (I) of the catalyst a compound obtained by milling (1) in a first stage
(1.1) 100 parts by weight of an alcoholate of the general formula $Mg(OD)_2$, where D is alkyl of 2 to 4 carbon atoms, with
(1.2) the appropriate number of parts by weight of a cholorotoluene of the formula

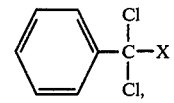

where X is chlorine or hydrogen, to give a molar ratio of alcoholate (1.1): chlorine in the chlorotoluene (1.2) of from 100:3 to 100:30, in a vibratory ball mill, with a milling acceleration of from 45 to 55 $m \times sec^{-2}$ for a period of from 10 to 60 hours at from −30° to −5° C. in the absence of a diluent, thereafter bringing together (2) in a second stage (2.1) 100 parts by weight of the material resulting from stage (1) with (2.2) from 500 to 1,000 parts by weight of titanium tetrachloride, the batch being kept for from 0.5 to 2 hours at from 70° to 90° C., with constant mixing, and the resulting solid being isolated, excess titanium tetrachloride being separated off, and then bringing together (3) in a third stage (3.1) 100 parts by weight of the solid resulting from stage (2) with (3.2) from 500 to 1,000 parts by weight of titanium tetrachloride, the batch being kept for from 0.5 to 2 hours at from 120° to 140° C. with constant mixing, and the resulting solid being isolated, excess titanium tetrachloride being separated off, and finally exposing the solid resulting from stage (3) to a carbon dioxide atmosphere as a pressure of from 0.2 to 5 bar, at from 0° to 50° C., for a period of from 1 to 30 minutes.

* * * * *